United States Patent [19]
Baeger

[11] Patent Number: 4,674,210
[45] Date of Patent: Jun. 23, 1987

[54] LIQUID CRYSTAL DISPLAY

[75] Inventor: Holm Baeger, Schwalbach, Fed. Rep. of Germany

[73] Assignee: VDO Adolf Schindling AG, Frankfurt am Main, Fed. Rep. of Germany

[21] Appl. No.: 781,446

[22] Filed: Sep. 27, 1985

[30] Foreign Application Priority Data

Oct. 4, 1984 [DE] Fed. Rep. of Germany ....... 3436409

[51] Int. Cl.$^4$ .............................................. G09F 13/20
[52] U.S. Cl. .................................... 40/542; 40/615; 40/427; 40/448
[58] Field of Search ............... 40/543, 564, 542, 427, 40/615, 434, 448; 350/360

[56] References Cited

U.S. PATENT DOCUMENTS

| | | | |
|---|---|---|---|
| 3,973,388 | 8/1976 | Yoshida | 40/448 |
| 4,021,945 | 5/1977 | Sussman | 40/448 |
| 4,403,216 | 9/1983 | Yokoi | 40/448 |
| 4,457,089 | 7/1984 | Phillips | 40/615 |
| 4,544,586 | 10/1985 | Molari | 40/615 |
| 4,568,080 | 2/1986 | Yokoi | 40/448 |
| 4,584,786 | 4/1986 | Georgopulos | 40/448 |

Primary Examiner—Gene Mancene
Assistant Examiner—Wenceslao J. Contreras
Attorney, Agent, or Firm—Martin A. Farber

[57] ABSTRACT

The invention relates to a liquid crystal display for the displaying of characters and symbols, having a liquid crystal cell 1 and polarizers 8 and 10, one arranged on the viewing side and one arranged on the rear side of the liquid crystal cell 1. Furthermore, a reflector 9 is arranged behind the rear polarizer 8. A surface of the viewing-side polarizer 10 is inclined to the plane of the liquid crystal cell 1. The surface of the viewing-side polarizer facing the liquid crystal cell 1 serves as a deflection surface 15 for light incident thereon approximately transversely to the plane of the liquid crystal cell 1.

17 Claims, 1 Drawing Figure

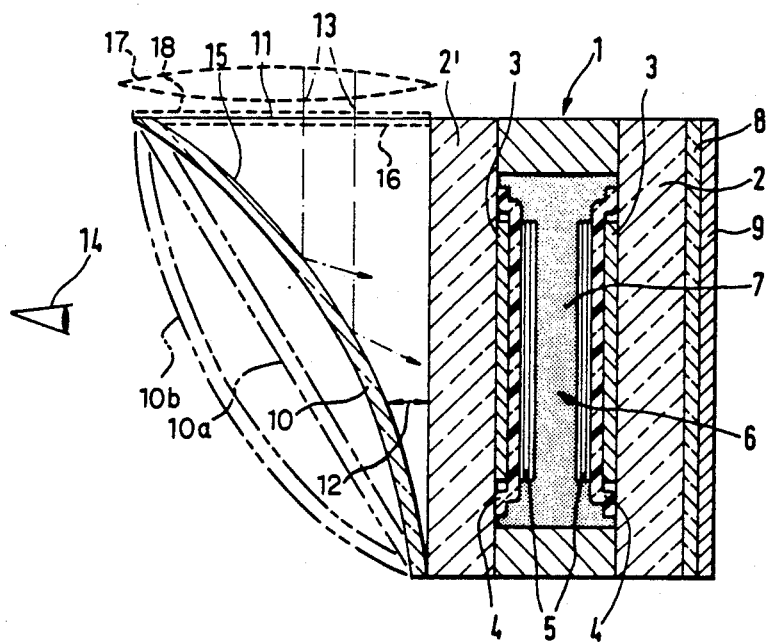

LIQUID CRYSTAL DISPLAY

BACKGROUND AND FIELD OF THE INVENTION

The present invention relates to a liquid crystal display for presenting characters and symbols, having a liquid crystal cell and separate polarizers one arranged on the viewing side and one arranged on the rear side of the liquid crystal cell, and having a reflector arranged behind the rear polarizer.

In such liquid crystal displays without external illumination it is known that ambient light from the viewing side passes through the first polarizer, the liquid cell and the second polarizer to the reflector and is reflected by the latter, over approximately the same path, back to the viewing side. Since on this path the light must pass four times through a polarizer and there are losses of light upon each of these passes, the contrast of the characters displayed is reduced.

This is particularly disadvantageous for the displaying of light characters against a dark background since in this type of display there is already a loss of light inherently in the liquid crystal cell.

The object of the present invention is therefore to create a liquid crystal cell of the above type the characters and symbols of which can be displayed with great contrast.

SUMMARY OF THE INVENTION

This object is achieved in accordance with the invention by providing that the surface of the viewing-side polarizer, which faces the liquid crystal display and may be flat or curved, is inclined to the plane of the liquid crystal cell, and that the surface of said polarizer serves as a deflection surface, the deflection surface being struck by light propagating approximately transversely to the plane of the liquid crystal cell.

By this development only three passes of the light through a polarizer are still necessary, as a result of which the contrast of the display is increased.

The viewing-side polarizer fulfills a twofold purpose in that, on the one hand, it serves as deflection surface for the ambient light to be introduced into the liquid crystal cell and at the same time retains its normal function as polarizer.

The use of such a liquid crystal display is particularly advantageous and space-saving if it is installed in a housing which is closed on the rear side of the liquid crystal cell to insure that no illumination is possible from that side.

The surface of the viewing-side polarizer can be flat or of convex or concave curvature.

In order to deflect as much light as possible to the liquid crystal cell, the viewing-side polarizer, if flat, is inclined preferably at an angle of less than 45°, and if curved, an average inclination of a tangent plane is less preferably than 45°.

The edge of the viewing side polarizer which is closer to the liquid crystal cell can be located in the region of an edge of the liquid crystal cell, as a result of which the space required and the structural size are kept small.

The viewing side polarizer can be disposed on a transparent plate, which is particularly advantageous if the polarizer is, for instance, a flexible foil.

For the admission of the ambient light, a light-inlet window, through which the light can be passed in an approximately transverse direction to the plane of the liquid crystal cell, can be located at the site of the maximum distance between the viewing-side polarizer and the liquid crystal cell.

BRIEF DESCRIPTION OF THE DRAWING

One embodiment of the invention is shown in the sole FIGURE of the drawing and will be described in further detail below.

DETAILED DESCRIPTION OF THE PREFERRED EMBODIMENTS

The liquid crystal display shown in cross section in the sole FIGURE of the drawing comprises a liquid crystal cell 1 which has two glass plates 2 and 2' arranged spaced apart from each other. On each of the facing surfaces of the glass plates 2 and 2' there is disposed an electrode 3 or electrode configuration and, over it, an insulating layer 4 and an orientation layer 5. The closed chamber 6 formed between the glass plates 2 and 2' is filled with a liquid crystal substance 7.

A polarizer 8 rests against the rear glass plate 2, the plate 2 supporting a preferably diffuse reflector 9.

In front of the viewing-side glass plate 2', a concave viewing side polarizer 10 is positioned with the lower edge of the polarizer 10 resting against the lower edge of the glass plate 2', and the surface 15 of the polarizer 10 being inclined at a given angle 12 to the plane of the liquid crystal cell 1. In this way the upper edge of the polarizer 10 is at the maximum distance from the liquid crystal cell 1.

In this region of the maximum distance between polarizer 10 and liquid crystal cell 1, there is disposed a light-inlet window 11 through which ambient light can be passed in a direction approximately transverse to the plane of the liquid crystal cell 1. The window 11 can be closed by a glass plate 16, not shown in phantom in the drawing.

The surface of the polarizer 10 which faces the liquid crystal cell 1 is developed as a deflection surface and deflects, in accordance with the rays 13, the ambient light entering through the light inlet window 11 towards the liquid crystal cell 1.

These deflected rays 13 pass through the liquid crystal cell 1 and are reflected diffusely at the reflector 9 through the liquid crystal cell 1 and the polarizer 10 to a viewer 14.

Due to the fact that the angle 12 is less than 45°, the light which enters through the light-inlet window 11 is, it is true, practically completely deflected at surface 15 towards the liquid crystal cell 1 while the light reflected by the reflector 9, however, passes practically completely through the polarizer 10 to the viewer 14.

In addition to the light which enters through the light-inlet window 11, the light entering from the viewing side is also utilised, so that the total amount of light utilized is considerably increased. This total amount of light can be even further increased if the light-inlet window is developed as a condensing lens (indicated in phantom-view at 17).

In order to compensate for the polarizer effect of the condensing lens, the light-inlet window can contain a polarizer (18 shown in phantom view) whose direction of polarization is rotated about 90° to the viewing-side polarizer.

Three configurations of the surface of the first polarizer 10 are shown in the drawing, the concave configuration indicated by the legend 10, the planar configuration indicated in phantom by the legend 10a, and the convex configuration indicated in phantom by the legend 10b.

I claim:

1. In a liquid crystal display for displaying characters and symbols, having a liquid crystal cell and a first polarizer disposed on the viewing side and a second polarizer disposed on the rear side of the liquid crystal cell, and having a reflector positioned behind the rear polarizer, the improvement wherein
a surface of the first polarizer is inclined to the plane of the liquid crystal cell, the surface of the first polarizer serving as a deflection surface for light striking thereon approximately transversely to the plane of the liquid crystal cell.

2. The liquid crystal display according to claim 1, wherein
said surface of said first polarizer is planar and is inclined at an angle of less than 45° to the plane of the liquid crystal cell.

3. The liquid crystal display according to claim 1, wherein
the surface of said first polarizer is curved with a convex or concave curvature.

4. The liquid crystal display according to claim 1, wherein
said first polarizer is inclined at an angle of less than 45° to the plane of the liquid crystal cell; and
the surface of said first polarizer is curved with a convex or concave curvature.

5. The liquid crystal display according to claim 1, wherein
an edge of said first polarizer which is closer to said liquid crystal cell is disposed alongside an edge of said liquid crystal cell.

6. The liquid crystal display according to claim 2, wherein
an edge of said first polarizer which is closer to said liquid crystal cell is disposed alongside an edge of said liquid crystal cell.

7. The liquid crystal display according to claim 1, wherein
the first polarizer is disposed on a transparent plate.

8. The liquid crystal display according to claim 2, wherein
the first polarizer is disposed on a transparent plate.

9. The liquid crystal display according to claim 2, further comprising
a light-inlet window through which light can be passed approximately transversely to the plane of the liquid crystal cell, said window being located in the region of the maximum distance between said first polarizer and said liquid crystal cell.

10. The liquid crystal display according to claim 9, further comprising
a light-inlet window through which light can be passed approximately transversely to the plane of the liquid crystal cell, said window being located in the region of the maximum distance between said first polarizer and said liquid crystal cell.

11. The liquid crystal display according to claim 10, wherein
said light-inlet window comprises a condensing lens.

12. The liquid crystal display according to claim 10, wherein
said light-inlet window comprises a polarizer having a direction of polarization rotated approximately 90° with respect to a polarization of said first polarizer.

13. In a liquid crystal display for displaying characters and symbols, having a liquid crystal cell and a first polarizer disposed on the viewing side and a second polarizer disposed on the rear side of the liquid crystal cell, and having a reflector positioned behind the rear polarizer, the improvement wherein
one edge of the first polarizer is closer to the plane of the liquid crystal cell than the opposite edge of the polarizer, the edge of said first polarizer which is closer to said liquid crystal cell is disposed alongside an edge of said liquid crystal cell, the surface of said first polarizer is curved with a concave curvature and said surface of the first polarizer serving as a deflection surface for light striking thereon approximately transversely to the plane of the liquid crystal cell.

14. The liquid crystal display according to claim 13, wherein
the first polarizer is disposed on a transparent plate.

15. The liquid crystal display according to claim 13, further comprising
a light-inlet window through which light can be passed approximately transversely to the plane of the liquid crystal cell, said window being located in the region of the maximum distance between said first polarizer and said liquid crystal cell.

16. The liquid crystal display according to claim 15, wherein
said light-inlet window comprises a condensing lens.

17. The liquid crystal display according to claim 15, wherein
said light-inlet window comprises a polarizer having a direction of polarization rotated approximately 90° with respect to a polarization of said first polarizer.

* * * * *